Nov. 20, 1962

J. T. ZURLO 3,064,512

BOOK TRIMMER AND THE LIKE

Filed June 7, 1960

INVENTOR.
JOHN T. ZURLO
BY
Kenyon + Kenyon
ATTORNEYS

United States Patent Office 3,064,512
Patented Nov. 20, 1962

3,064,512
BOOK TRIMMER AND THE LIKE
John T. Zurlo, Champlain, N.Y., assignor to T. W. & C. B. Sheridan Co., New York, N.Y., a corporation of New York
Filed June 7, 1960, Ser. No. 34,406
5 Claims. (Cl. 83—174)

This invention relates to book trimmers and the like.

An object is to provide a book trimmer and the like of the true shear type using two blades which move completely past each other when shearing, and which permits small mistakes when adjusting the shearing clearance between the two blades, without putting the equipment out of operation because of a damaged blade. Devices of this kind are provided with means for adjusting the blades with great precision to permit exact alignment of the blades' shearing edges, and if the adjustment is too close even to an extremely small degree, one cutting edge strikes the other so as to require a blade replacement. It is with this problem that the invention is particularly concerned.

A specific example of the invention is illustrated by the accompanying drawings in which.

Figure 1:
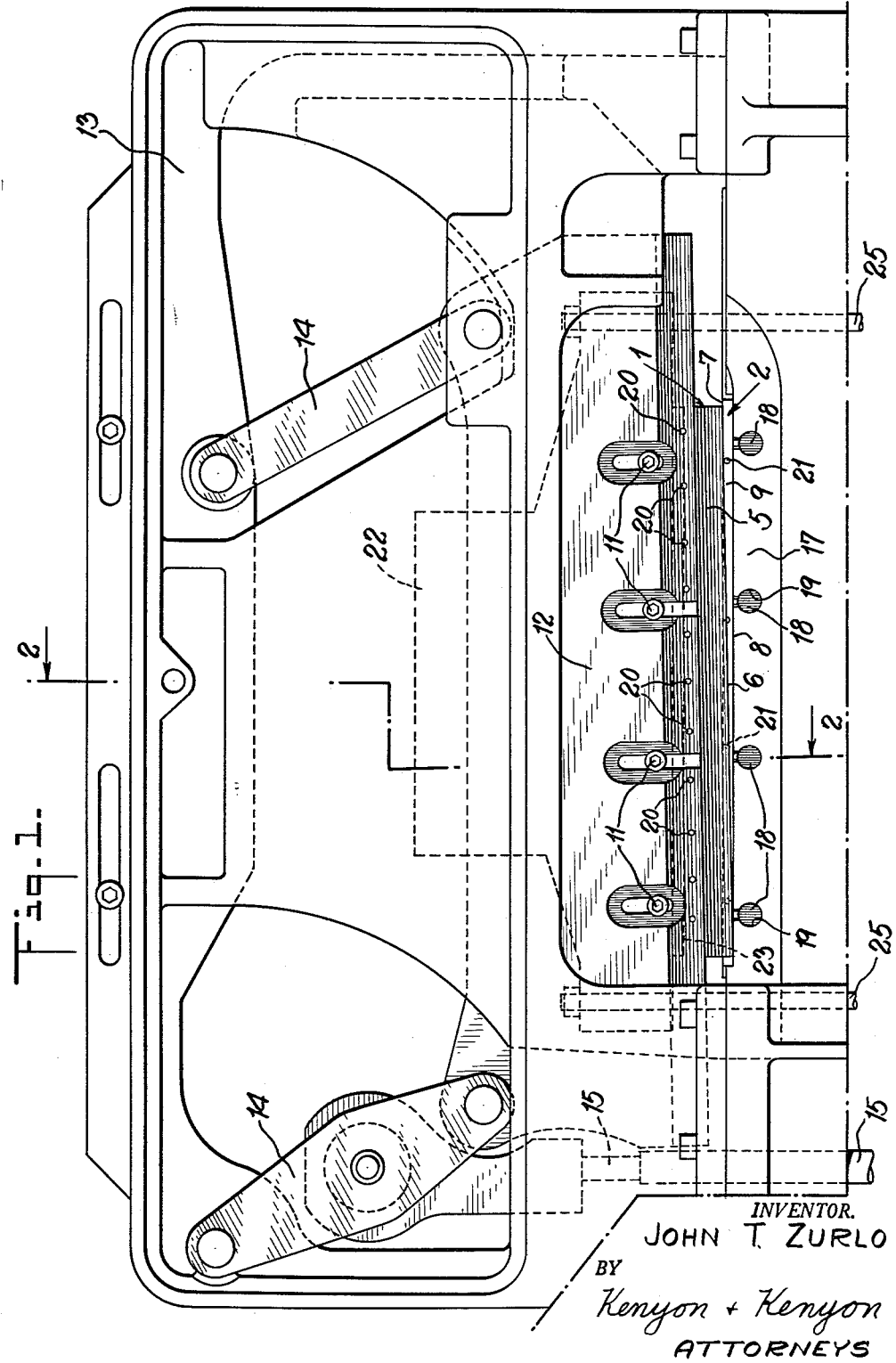
FIG. 1 is a front view of a book trimmer showing the parts required to illustrate the invention.
Figure 2:
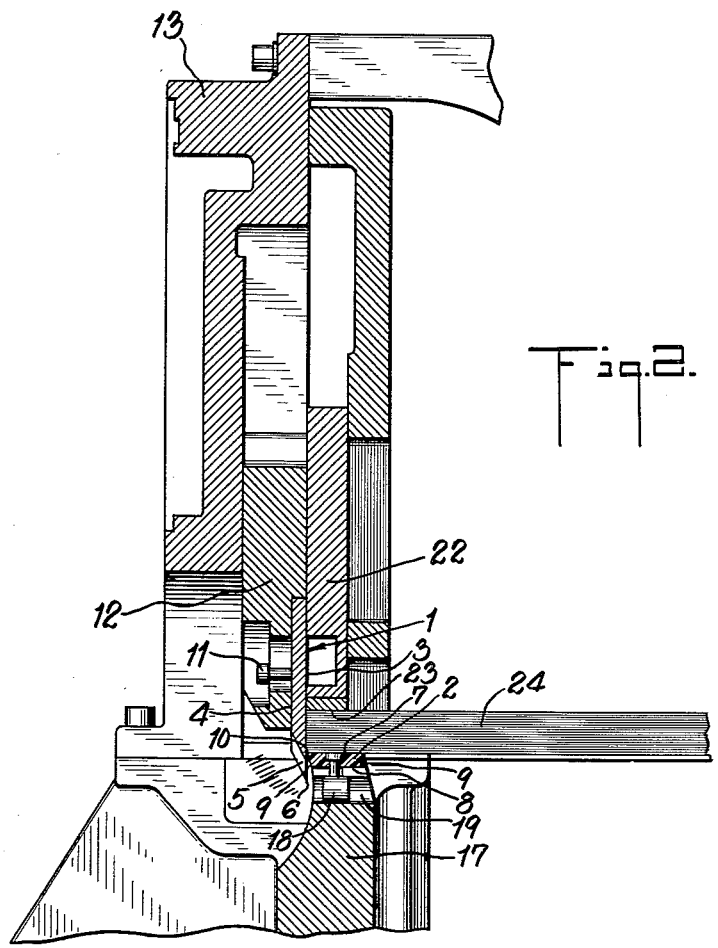
FIG. 2 is a cross section taken on the line 2—2 in FIG. 1.
Figure 3:
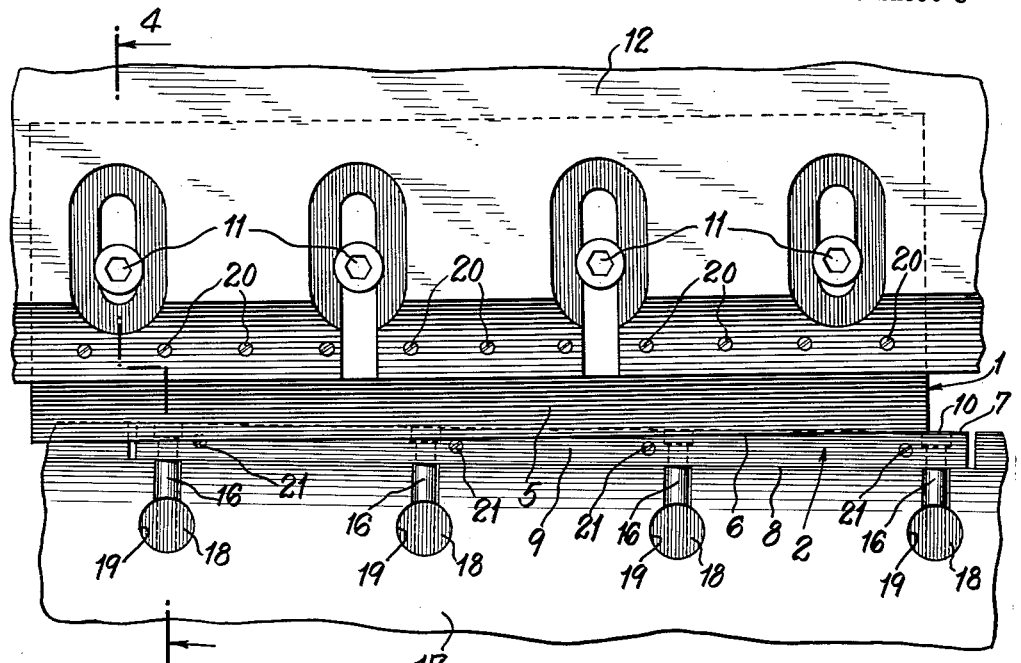
FIG. 3 is an enlargement taken from FIG. 1.
Figure 4:
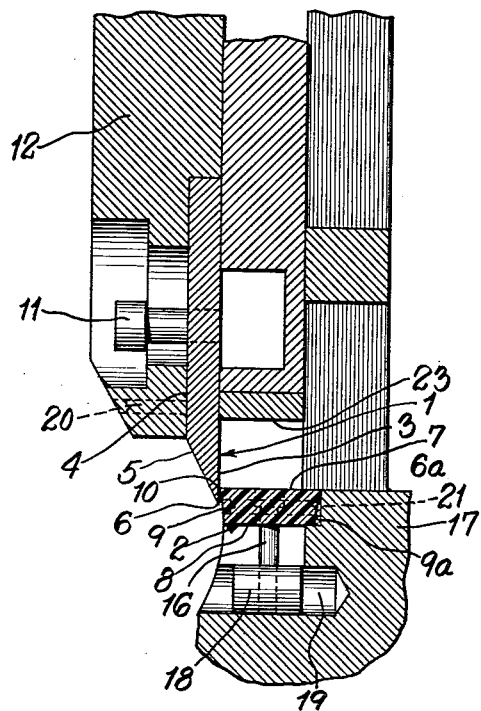
FIG. 4 is a cross section taken on the line 4—4 in FIG. 3.

As shown by these drawings, the illustrated book trimmer is of the true shear type comprising first and second blades 1 and 2 respectively. These blades may be referred to as the upper and lower knives respectively. The upper knife has a flat side 3 and a beveled side 4, the latter having a bevel 5 joining with the flat side 3 to form a shear edge 6. Also, the lower knife has a flat side 7 and a beveled side 8, the latter having a bevel 9 joining with the flat side 7 to form a shear edge 10. The upper and lower knives, or blades, are mounted with their flat sides 3 and 7 interfacing at right angles to each other and their shear edges 6 and 10 pointing in intersecting directions.

The first blade or upper knife 1 is mounted by being secured by cap screws 11 to a knife mount 12 which swings up and down arcuately with respect to the knife 2 in a vertical plane because it is mounted by the trimmer's frame 13 by way of two swinging links 14 of which one is swingingly powered by a connecting rod 15.

The second blade or lower knife 2 is stationarily mounted by cap screws 16 which connect it with the trimmer's bed 17 by way of nuts 18 which when loosened can slide transversely with respect to the knife 2 because these nuts 18 are cylindrical and located in cylindrical bores 19 formed in the bed 17. The cap screws 11 and 16 extend through appropriately formed slots so that when loosened the respective blades may be adjusted in the planes of their respective flat sides 3 and 7.

In addition to the above adjustment either or both of the blades or knives 1 and 2 may be adjusted as required to exactly align their respective edges 6 and 10. This is done by providing the lower end of the knife mount 12 with a series of set screws 20 which, when the cap screws 11 are loosened may be screwed in or out to vary the position of the cutting edge 6 towards and from the cutting edge 10. Also, the blade or knife 2 is provided with set screws 21 having their outer ends sunk well below the bevel 9 and which when the cap screws 11 are loosened may be screwed in or out to vary the position of the edge 10 relative to the edge 6.

A book trimmer in particular must make precision cuts. In the shear type illustrated the untrimmed edges overhang the edge 10 of the lower knife 2. There is no support beneath the overhanging portions of the untrimmed leaves of the book. A number of books may be trimmed at once or a very thick book, such as a telephone book or a mail order catalogue may be trimmed. All of the parts of the trimmer must be constructed very strongly and the upper knife mount 12 must be guided with great precision relative to the trimmer's bed 17. With the flat side 3 of the upper knife 1, and therefore its edge 6, exactly aligned with the edge 10 of the lower knife 2 the shearing action is clean and effected with precision. With the upper knife raised the connecting rod 15 is drawn downwardly with great force and the upper knife arcuately moves downwardly so that its edge 6 travels completely downwardly below the edge 10 with a true shearing action.

Now it can be seen that to obtain the above precision exact adjustment of the two blades or upper and lower knives 1 and 2 is necessary. This is done by the operator adjusting the series of set screws 20 and 21. The screws 20 are adjusted to bring the flat side 3 of the upper knife as 1 exactly as possible to a vertical position truly at right angles to the side 7 of the lower knife 2. Then the set screws 21 are adjusted to bring the lower knife's edge 10 to an exact position just permitting passage of the upper knife and with as little clearance as is possible. The trimmer is operated slowly as the adjustments proceed so as to check the clearance between the two knives. In doing this it is very easy to make the mistake of eliminating all clearance so that the edge 6 of the upper knife butts against the flat side 7 of the lower knife. Even though the trimmer may be operated very carefully during this setting up period its parts are necessarily large and heavy and, therefore, damage is done to the knives before the lack of clearance is detected.

Now it is to be noted that paper cutters do not involve the same problem because they consist simply of a cutting knife which moves downwardly through a stack of paper sheets and into a soft cutting stick firmly supported on all but its upper side by being positioned in an interfitting groove formed in the bed of the cutter. There is only one blade or knife and it does not have to be aligned with anything else, it merely stabbing through the paper and into the cutting stick. Such sticks are made of wood, plastic and other materials and they function simply as a cushion into which the cutting edge of the cutting knife sinks to permit cutting through the bottom sheet. Further, the problem is not involved by shears which operate like large scissors with the two blades having an overlapped relationship at one end at all times so that by spring action the two blades are wedged apart as they come together. Contrastingly in the case of a shear type book trimmer both blades or knives must completely separate to permit the introduction of work and they must come together in precise shearing relationship with each other.

Heretofore both blades or upper and lower knives 1 and 2 have been made of hardened steel. This is the obvious material to use because of the great stresses involved at the cutting edges 6 and 10 of the two blades. It is the use of such hardened materials that causes damage in case the two blades strike together.

The present invention is based on the discovery that the lower knife 2 may be made from plastic. The plastic may be any of the commercially available plastics providing it is firm enough to back-up and support the shear edge 10 when the two blades are reciprocated together to cause the edges 6 and 10 to pass each other with the work located therebetween and thus sheared. The plastic may be reinforced by fabric or fibers. However, in all cases the plastic should have the characteristic that if the lower knife is slightly misadjusted so that the edge 6 strikes the lower knife's side 7 the upper knife merely shaves the plastic lower knife slightly to provide a clean surface which can itself function as the cutting edge of the lower knife. It is to be understood that any misadjustment is extremely slight when the trimmer is adjusted by an experienced operator. If too many mistakes are made the lower knife must be removed and machined with a new bevel 9. As shown the lower knife is made reversible with a bevel 9a providing a second edge 6a to prolong the useful service life of the lower knife.

This plastic lower knife does not act like a cutting stick but must function as a shear in cooperation with the upper knife. This means that the entire bevel 9 is unsupported. It is surprising that a non-metallic material, such as plastic, can carry the stresses required by this shearing action. However, in fact, many of the modern plastics operate satisfactorily when machined to form the lower knife with a true shear type book trimmer. Precision cuts are obtained and the more expensive upper knife 1 is not damaged when the inevitable slight mistakes are made while bringing the two knives into their proper relative positions.

The angularities of the bevels 5 and 9 of the first and second blades 1 and 2 relative to their flat sides are small and large respectively so that the first blade's bevel 5 is longer and forms a gradual taper for penetrating the work and the second blade's bevel 9 is shorter and provides firmer backup and support for this blade's shearing edge 10. The upper knife's bevel for example may be somewhat less than 30° with respect to its side 3 while the corresponding angularity between the bevel 9 and the flat side 7, of the lower knife, may be from a few degrees to not more than 10°.

Smooth shearing of the plastic when a slight mistake is made is assured by the compound relative motion between the blades or knives resulting from the operation of the upper knife's mount 12 because of its operation by the links 14. This mount 12 is guided to permit it to move arcuately. Thus there is a true sliding or shearing action between the edges 6 and 10 promoting clean shaving of the second blade or lower knife 2 upon inadvertent butting therewith by the upper knife's shear edge 6. This forms a usable new shear edge on the lower knife providing the butting location of the upper knife's edge 6 is very close to the shear edge 10. It is unusual for a good operator to make a big mistake. A mistake of 1/1000 of an inch causes damage when both knives are made from steel. With too many mistakes the bevel 9 is shaved away so that the edge 10 is no longer capable of cleanly shearing when cooperating with the upper knife, this requiring remachining of the plastic lower knife.

The illustrated book trimmer includes a book clamp 22 reciprocatively mounted by the trimmer's frame to slide up and down directly along the flat side of the upper knife 1. The bottom face 23 of this book clamp is flat and presses the book or other stack of paper sheets 24 firmly down on the flat side 7 of the plastic lower knife. This book clamp is pulled downwardly by tension rods 25 to which a large force may be applied. In this fashion the paper sheets or book leaves is clamped firmly as a solid mass and thus in effect joining with the flat side 7 of the plastic lower knife. Everything is compacted together in this area right up and close to the cutting edge 10 of the plastic lower knife. Thus the plastic knife is supported firmly throughout most if not all of its sides 7 while its beveled side 8 is, of course, supported by the trimmer's bed 17 where the lower knife rests in a suitable recess. The book clamp does not reach entirely to the edge 10 of the lower knife but it comes very close to it. Because of the use of this book clamp the plastic lower knife is more thoroughly supported than it would be otherwise.

I claim:

1. A shear for trimming books and the like and comprising first and second blades each having a flat side and a beveled side having a bevel joining with the flat side to form a shear edge, means for mounting said blades with their flat sides interfacing substantially at right angles to each other and their shear edges pointing in intersecting directions, means for causing relative reciprocation between said blades, between an open position where their shear edges are completely separated and a closed position where these edges have passed each other and means for adjusting the relative locations of said blades to substantially align the flat side of the first blade with the shear edge of the second blade and permitting inadvertent adjustment causing the shear edge of the first blade to butt the flat side of the second blade when said reciprocation moves said blades together, said first blade being made of hard metal and said second blade being made of non-metallic material soft enough to be shaved by said blade without damage to the latter's shear edge and firm enough to back-up and support said second blade's shear edge when said blades are reciprocated together to cause said edges to pass each other with work located therebetween and sheared thereby.

2. A shear for trimming books and the like and comprising first and second blades each having a flat side and a beveled side having a bevel joining with the flat side to form a shear edge, means for mounting said blades with their flat sides interfacing substantially at right angles to each other and their shear edges pointing in intersecting directions, means for causing relative reciprocation between said blades, between an open position where their shear edges are completely separated and a closed position where these edges have passed each other and means for adjusting the relative locations of said blades to substantially align the flat side of the first blade with the shear edge of the second blade and permitting inadvertent adjustment causing the shear edge of the first blade to butt the flat side of the second blade when said reciprocation moves said blades together, said first blade being made of hard metal and said second blade being made of non-metallic material soft enough to be shaved by said blade without damage to the latter's shear edge and firm enough to back-up and support said second blade's shear edge when said blades are reciprocated together to cause said edges to pass each other with work located therebetween and sheared thereby, the angularities of the bevels of said first and second blades relative to their flat sides being small and large respectively so that the first blade's bevel is longer and forms a gradual taper for penetrating the work and the second blade's bevel is shorter and provides a firmer back-up and support for the second blade's shearing edge.

3. A shear for trimming books and the like and comprising first and second blades each having a flat side and a beveled side having a bevel joining with the flat side to form a shear edge, means for mounting said blades with their flat sides interfacing substantially at right angles to each other and their shear edges pointing in intersecting directions, means for causing relative reciprocation between said blades, between an open position where their shear edges are completely separated and a closed position where these edges have passed each other and means for adjusting the relative locations of said blades to substantially align the flat side of the first blade with the shear edge of the second blade and permitting inadvertent adjustment causing the shear edge of the first blade to butt the flat side of the second blade when said reciprocation moves said blades together, said first blade being made of hard metal and said second blade being made of non-metallic material soft enough to be shaved by said blade without damage to the latter's shear edge and firm enough to back-up and support said second blade's shear edge when said blades are reciprocated together to cause said edges to pass each other with work located therebetween and sheared thereby, the angularities of the bevels of said first and second blades relative to their flat sides being small and large respectively so that the first blade's bevel is longer and forms a gradual taper for penetrating the work and the second blade's bevel is shorter and provides a firmer back-up and support for the second blade's shearing edge, said reciprocation causing means effecting a compound relative motion between said blades including a relative sliding motion longitudinally with respect to the first blade's flat side and the second blade's shear edge, whereby to promote clean shaving of the second blade upon inadvertent butting therewith by the first blade's shear edge, and thereby forming a usable new shear edge on the second blade when the abutting location of the first blade's shear edge is very close to the second blade's shear edge.

4. A shear for trimming books and the like and comprising first and second blades each having a flat side and a beveled side having a bevel joining with the flat side to form a shear edge, means for mounting said blades with their flat sides interfacing substantially at right angles to each other and their shear edges pointing in intersecting directions, means for causing relative reciprocation between said blades, between an open position where their shear edges are completely separated and a closed position where these edges have passed each other and means for adjusting the relative locations of said blades to substantially align the flat side of the first blade with the shear edge of the second blade and permitting inadvertent adjustment causing the shear edge of the first blade to butt the flat side of the second blade when said reciprocation moves said blades together, said first blade being made of hard metal and said second blade being made of non-metallic material soft enough to be shaved by said blade without damage to the latters' shear edge and firm enough to back-up and support said second blade's shear edge when said blades are reciprocated together to cause said edges to pass each other with work located therebetween and sheared thereby, the angularities of the bevels of said first and second blades relative to their flat sides being small and large respectively so that the first blade's bevel is longer and forms a gradual taper for penetrating the work and the second blade's bevel is shorter and provides a firmer back-up and support for the second blade's shearing edge, said reciprocation causing means effecting a compound relative motion between said blades including a relative sliding motion longitudinally with respect to the first blade's flat side and the second blade's shear edge, whereby to promote clean shaving of the second blade upon inadvertent butting therewith by the first blade's shear edge, and thereby forming a usable new shear edge on the second blade when the abutting location of the first blade's shear edge is very close to the second blade's shear edge, said non-metallic material comprising a plastic.

5. A shear for trimming books and the like and comprising first and second blades each having a flat side and a beveled side having a bevel joining with the flat side to form a shear edge, means for mounting said blades with their flat sides interfacing substantially at right angles to each other and their shear edges pointing in intersecting directions, means for causing relative reciprocation between said blades, between an open position where their shear edges are completely separated and a closed position where these edges have passed each other and means for adjusting the relative locations of said blades to substantially align the flat side of the first blade with the shear edge of the second blade and permitting inadvertent adjustment causing the shear edge of the first blade to butt the flat side of the second blade when said reciprocation moves said blades together, said first blade being made of hard metal and said second blade being made of non-metallic material soft enough to be shaved by said blade without damage to the latter's shear edge and firm enough to back-up and support said second blade's shear edge when said blades are reciprocated together to cause said edges to pass each other with work located therebetween and sheared thereby, the angularities of the bevels of said first and second blades relative to their flat sides being small and large respectively so that the first blade's bevel is longer and forms a gradual taper for penetrating the work and the second blade's bevel is shorter and provides a firmer back-up and support for the second blade's shearing edge, said reciprocation causing means effecting a compound relative motion between said blades including a relative sliding motion longitudinally with respect to the first blade's flat side and the second blade's shear edge, whereby to promote clean shaving of the second blade upon inadvertent butting therewith by the first blade's shear edge, and thereby forming a usable new shear edge on the second blade when the abutting location of the first blade's shear edge is very close to the second blade's shear edge, said non-metallic material comprising a plastic and said shear including a clamp for tightly clamping said work against the flat side of said second blade.

References Cited in the file of this patent

UNITED STATES PATENTS

| | | |
|---|---|---|
| 290,004 | Donnell | Dec. 11, 1883 |
| 383,714 | Donnell | May 29, 1888 |
| 1,416,800 | Detjen | May 23, 1922 |
| 2,100,930 | Aiken | Nov. 30, 1937 |
| 2,734,572 | Pater | Feb. 14, 1956 |

FOREIGN PATENTS

| | | |
|---|---|---|
| 395,431 | Germany | May 19, 1924 |